United States Patent
Daynes et al.

(10) Patent No.: US 7,870,171 B2
(45) Date of Patent: Jan. 11, 2011

(54) METHOD AND SYSTEM FOR GARBAGE COLLECTION IN A MULTITASKING ENVIRONMENT

(75) Inventors: Laurent Philippe Daynes, Saint-Ismier (FR); Sunil Soman, Goleta, CA (US); Grzegorz Jan Czajkowski, Menlo Park, CA (US)

(73) Assignee: Oracle America, Inc., Redwood City, CA (US)

(*) Notice: Subject to any disclaimer, the term of this patent is extended or adjusted under 35 U.S.C. 154(b) by 358 days.

(21) Appl. No.: 11/705,378

(22) Filed: Feb. 12, 2007

(65) Prior Publication Data

US 2008/0195681 A1   Aug. 14, 2008

(51) Int. Cl.
  *G06F 12/00* (2006.01)
  *G06F 17/30* (2006.01)
(52) U.S. Cl. ....................................................... 707/819
(58) Field of Classification Search .................. 707/206
    See application file for complete search history.

(56) References Cited

U.S. PATENT DOCUMENTS

| | | | |
|---|---|---|---|
| 4,989,134 A * | 1/1991 | Shaw ........................ | 707/206 |
| 5,355,483 A | 10/1994 | Serlet | |
| 5,502,833 A | 3/1996 | Byrn et al. | |
| 5,652,883 A | 7/1997 | Adcock | |
| 5,687,368 A | 11/1997 | Nilsen | |
| 5,692,193 A * | 11/1997 | Jagannathan et al. ........ | 718/106 |
| 5,900,001 A | 5/1999 | Wolczko et al. | |
| 5,903,900 A | 5/1999 | Knippel et al. | |
| 5,915,255 A | 6/1999 | Schwartz et al. | |
| 5,920,876 A | 7/1999 | Ungar et al. | |
| 5,960,087 A | 9/1999 | Tribble et al. | |
| 6,038,572 A | 3/2000 | Schwartz et al. | |
| 6,049,810 A | 4/2000 | Schwartz et al. | |
| 6,081,665 A | 6/2000 | Nilsen et al. | |
| 6,115,782 A | 9/2000 | Wolczko et al. | |
| 6,216,212 B1 | 4/2001 | Challenger et al. | |
| 6,249,793 B1 | 6/2001 | Printezis et al. | |
| 6,308,185 B1 * | 10/2001 | Grarup et al. ............... | 707/206 |
| 6,493,730 B1 | 12/2002 | Lewis et al. | |
| 6,510,440 B1 | 1/2003 | Alpern et al. | |
| 6,560,773 B1 | 5/2003 | Alexander, III et al. | |
| 6,622,226 B1 * | 9/2003 | Dussud ....................... | 711/159 |
| 6,671,707 B1 | 12/2003 | Hudson et al. | |

(Continued)

OTHER PUBLICATIONS

Soman, S., Daynes, L., Krintz, C., "Task-Aware Garbage Collection in a Multi-Tasking Virtual Machinie", ISMM'06,Ottawa, Ontario, Canada, Jun. 10-11, 2006, pp. 64-73.

(Continued)

*Primary Examiner*—Charles Rones
*Assistant Examiner*—Kris Mackes
(74) *Attorney, Agent, or Firm*—Osha • Liang LLP

(57) ABSTRACT

A method for garbage collection involves allocating multiple objects in a young generation, where the objects are specific to a task, and where the young generation is specific to the task, performing a minor garbage collection, where an object of the multiple objects is promoted to a promotion area in a shared older generation, and where the promotion area is specific to the task, and freeing the promotion area when the task terminates to obtain a free promotion area without performing a major garbage collection.

19 Claims, 10 Drawing Sheets

U.S. PATENT DOCUMENTS

| | | | |
|---|---|---|---|
| 6,826,583 B1* | 11/2004 | Flood et al. .................. 707/206 | |
| 6,829,739 B1 | 12/2004 | Wu | |
| 6,839,822 B2 | 1/2005 | Knippel et al. | |
| 6,928,460 B2 | 8/2005 | Nagarajan et al. | |
| 6,978,285 B2 | 12/2005 | Li | |
| 7,039,664 B2 | 5/2006 | Garthwaite | |
| 7,043,509 B2 | 5/2006 | Detlefs | |
| 7,051,056 B2 | 5/2006 | Rodriguez-Rivera et al. | |
| 7,089,272 B1 | 8/2006 | Garthwaite et al. | |
| 7,107,426 B2 | 9/2006 | Kolodner et al. | |
| 7,114,045 B1 | 9/2006 | Pliss et al. | |
| 7,149,866 B2 | 12/2006 | Blandy | |
| 7,246,142 B2 | 7/2007 | Sexton et al. | |
| 7,454,448 B1 | 11/2008 | Daynes et al. | |
| 2002/0133533 A1 | 9/2002 | Czajkowski et al. | |
| 2002/0194421 A1* | 12/2002 | Berry et al. .................. 711/100 | |
| 2004/0111448 A1 | 6/2004 | Garthwaite | |
| 2004/0162861 A1* | 8/2004 | Detlefs ....................... 707/206 | |
| 2006/0155791 A1 | 7/2006 | Tene et al. | |
| 2006/0161755 A1 | 7/2006 | Uchikawa et al. | |
| 2006/0230087 A1 | 10/2006 | Andreasson | |
| 2007/0016634 A1* | 1/2007 | Sekiguchi et al. ........... 707/206 | |
| 2007/0180002 A1 | 8/2007 | Printezis et al. | |
| 2007/0288538 A1 | 12/2007 | Bacon et al. | |
| 2009/0150465 A1 | 6/2009 | Branda et al. | |

OTHER PUBLICATIONS

Ungar, D., "Generation Scavenging: A Non-Disruptive High Performance Storage Reclamation Algorithm", Department of Electrical Engineering and Computer Sciences, University of California, 1984, pp. 157-167.

Wilson, P., "Uniprocessor Garbage Collection Techniques", International Workshop on Memory Management, St. Malo, France, Sep. 1992, 34 pages.

Czajkowski, G., Daynes, L., Titzer, B., "A Multi-User Virtual Machine", Proceedings of the General Track: USENIX Annual Technical Conference, 2003, pp. 85-98.

Czajkowski, G., Daynes, L., "Multitasking without Compromise: a Virtual Machine Evolution", Proceedings of the 2001 ACM SIGPLAN Conference on Object-Oriented Programming Systems, Languages and Applications, 2001, 14 pages.

Azagury, et al., "Combining Card Marking with Remembered Sets: How to Save Scanning Time", ISMM'98 Proceedings of the First International Symposium on Memory Management, vol. 34(3) of ACM SIGPLAN Notices, Vancouver, Oct. 1998. pp. 10-19.

Hölzle, U., "A Fast Write Barrier for Generational Garbage Collectors", OOPSLA'93 Garbage Collection Workshop, Washington, D.C., Oct. 1993, 6 pages.

Hosking, A. L., Hudson, R. L., "Remembered sets can also play cards", OOPSLA'93 Workshop on Garbage Collection in Object-Oriented Systems, Washington, D.C., Sep. 1993, 8 pages.

Hosking, A. L., Moss, J. E. B., Stefanovic, D., "A Comparative Performance Evaluation of Write Barrier Implementations", Proceedings from the ACM Conference on Object-Oriented Programming Systems, Languages, and Applications, Vancouver, Canada, Oct. 1992, 18 pages.

Hudson, R. L., et al., "Garbage Collecting in the World: One Car at a Time", Proceedings of the 12th ACM SIGPLAN conference on Object-oriented programming, systems, languages, and applications, 1997, 14 pages.

"Run and Reporting Rules for SPEC JVM Client98 Benchmark Suite", http://www.spec.org/jvm98/jvm98/doc/runrules.html, Jun. 18, 1998, 10 pages.

Domani, T., et al., "Thread-Local Heaps for Java", ISMM'02, Berlin, Germany, Jun. 20-21, 2002, pp. 76-87.

Daynes, L., Soman, S., Czajkowski, G., "Using Promotion Areas to improve Garbage Collection in multi-tasking Virtual Machine", Sep. 7, 2005, 18 pages.

Critchlow, T., "A Distributed Garbage Collection Algorithm", University of Utah, Jul. 30, 1992, pp. 1-64.

Agesen, O., "GC Points in a Threaded Enviroment", Sun Microsystems, Inc., Dec. 1998, 23 pages.

Lee, et al. "A Pure Reference Counting Garbage Collector", University of Colorado, Jan. 2001, 50 pages.

* cited by examiner

METHOD AND SYSTEM FOR GARBAGE COLLECTION IN A MULTITASKING ENVIRONMENT

CROSS-REFERENCE TO RELATED APPLICATIONS

Subject matter contained in the present application may be related to subject matter contained in copending U.S. patent application Ser. No. 11/705,361, entitled "Method and System for Minor Garbage Collection," filed on Feb. 12, 2007 and in the names of the same inventors and commonly owned by the same assignee. U.S. patent application Ser. No. 11/705,361 is hereby incorporated by reference in its entirety.

BACKGROUND

In computer systems, garbage collection refers to automated memory reclamation. Specifically, a garbage collector is a process that differentiates between live objects (i.e., objects that are still in use) and dead objects (i.e., objects that are no longer in use). Differentiating between live objects and dead objects typically involves traversing a graph of live objects to identify objects that should not be discarded.

Once live objects are identified, the garbage collector frees memory occupied by dead objects, and the freed memory is then available for other uses. In contrast, manual memory reclamation requires software developers to write code to explicitly free memory when objects are no longer needed. Errors in manual memory reclamation code may result in unnecessarily large memory footprints, memory leaks, etc. Thus, garbage collection reduces the probability of such errors occurring.

Garbage collection may be used in many different operating environments. For example, garbage collection may be used in a multitasking environment. A task is a set of executable instructions loaded into memory, and multitasking refers to situations in which multiple tasks are loaded into memory simultaneously. Specifically, each task is an isolated unit of execution and generally cannot access objects associated with other tasks. If a computer system includes only a single processor, only a single task can execute at a time. Still, execution may transfer from one task to another. For example, execution may transfer if an executing task reaches a stopping point, if a pending task has higher priority, if a maximum execution time is reached for an executing task, etc. In multi-processor computer systems, tasks may execute on each processor concurrently.

SUMMARY

In general, in one aspect, the invention relates to a method for garbage collection. The method comprises allocating a first plurality of objects in a young generation, wherein the first plurality of objects is specific to a first task, and wherein the young generation is specific to the first task, performing a minor garbage collection, wherein a first object of the first plurality of objects is promoted to a first promotion area in a shared older generation, and wherein the first promotion area is specific to the first task, and freeing the first promotion area when the first task terminates to obtain a first free promotion area without performing a major garbage collection.

In general, in one aspect, the invention relates to a method for garbage collection. The method comprises promoting a plurality of objects from a young generation to a first promotion area in a shared older generation, wherein the young generation and the first promotion area are specific to a first task, and performing a major garbage collection. The major garbage collection comprises identifying a plurality of live objects in the shared older generation, computing a new address for each live object of the plurality of objects, locating, in the first promotion area, a first live object of the plurality of live objects, adjusting boundaries of the first promotion area based on the new address of the first live object and a new address of a second live object in a second promotion area, and moving the first live object to the new address.

In general, in one aspect, the invention relates to a system. The system comprises a memory heap comprising a young generation specific to a task, and a shared older generation comprising a promotion area specific to the task. The system further comprises a garbage collector configured to allocate a first plurality of objects in a young generation, wherein the plurality of objects is specific to the task, perform a minor garbage collection, wherein a first object of the plurality of objects is promoted to the promotion area, and free the promotion area when the task terminates to obtain a free promotion area without performing a major garbage collection.

In general, in one aspect, the invention relates to a computer readable medium. The computer readable medium comprises executable instructions for garbage collection by allocating a first plurality of objects in a young generation, wherein the first plurality of objects is specific to a first task, and wherein the young generation is specific to the first task, performing a minor garbage collection wherein a first object of the first plurality of objects is promoted to a first promotion area in a shared older generation, wherein the first promotion area is specific to the first task, and freeing the first promotion area when the first task terminates to obtain a first free promotion area without performing a major garbage collection.

Other aspects of the invention will be apparent from the following description and the appended claims.

DETAILED DESCRIPTION

Figure 1:
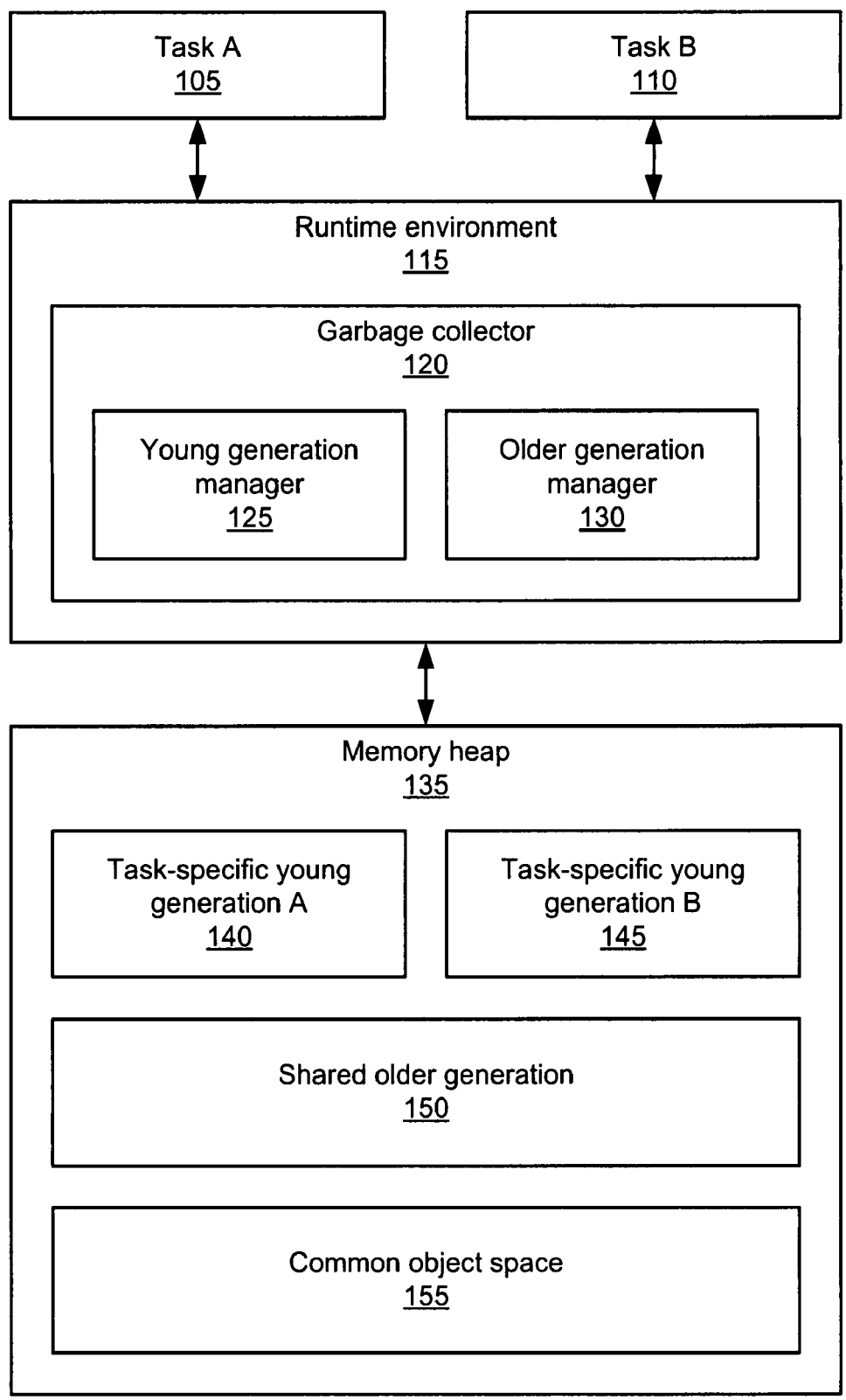
FIG. 1 shows a diagram of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for garbage collection in a multitasking environment. Tasks are assigned task-specific young generations and share an older generation. Objects that satisfy promotion criteria are promoted from the task-specific young generations to the shared older generation. Specifically, objects are promoted to task-specific promotion areas in the shared older generation.

For ease of discussion, embodiments of the invention are discussed herein using a single shared older generation. However, those skilled in the art will appreciate that multiple older generations may exist, some of which may not be shared between tasks. Specifically, in one or more embodiments, multiple older generations (whether shared or not) allow multiple levels of generational garbage collection. Accordingly, the scope of the invention should be not be considered limited to only a single older generation.

FIG. 1 shows a diagram of a system in accordance with one or more embodiments of the invention. A runtime environment (115) is configured to execute task A (105) and task B (110). Task A (105) and task B (110) may be any type of executable task, and may belong to the same software application or to different software applications. Further, the runtime environment (115) may be a Java™ virtual machine, a Microsoft® .NET framework, an operating system, or any other runtime environment that supports garbage collection. Java™ is a trademark of Sun Microsystems, Inc. located in Santa Clara, Calif. Microsoft® is a registered trademark of Microsoft Corporation located in Redmond, Wash.

In one or more embodiments, memory used by task A (105) and task B (110) is allocated to a memory heap (135). Specifically, the runtime environment (115) is configured to manage allocation of the memory heap (135) for task A (105) and task B (110). More specifically, the runtime environment (115) is configured to designate areas of the memory heap (135) for task-specific young generation A (140), task-specific young generation B (145), and a shared older generation (150). The memory heap (135) may include random access memory (RAM), flash memory, any other type of rewritable computer storage, or any combination thereof.

Further, another portion of the memory heap (135) may be designated as common object space (155), i.e., memory for allocating common objects between task A (105) and task B (110). Common object space (155) reduces the amount of memory required when multiple tasks are using the same objects. For example, application programming interface (API) objects provided by the runtime environment (115) may be placed in the common object space (155). Those skilled in the art will appreciate that objects storing task-specific information should generally not be placed in the common object space (155).

In one or more embodiments, the runtime environment (115) includes a garbage collector (120). Specifically, the garbage collector (120) includes one or more modules (e.g., threads, classes, functions, etc.) for performing garbage collection. For example, the garbage collector (120) may include a young generation manager (125) configured to manage allocation of objects to task-specific young generation A (140) and task-specific young generation B (145). Further the garbage collector (120) may include an older generation manager (130) configured to manage allocation of objects to the shared older generation (150).

In one or more embodiments, the use of task-specific young generations allows for task-specific minor garbage collections. Thus, a minor garbage collection may be performed for one task, while another task continues to execute. Further, execution pauses caused by task-specific minor garbage collections are proportional to the number of objects stored in the task-specific young generation, rather than the number of objects in all young generations.

Moreover, because young objects belonging to separate tasks are isolated from each other, memory occupied by a task-specific young generation may be reclaimed when the task terminates, without performing a minor collection. Specifically, memory used by the task-specific young generation may be made available for use by other tasks.

In addition, task-specific young generations allow for the young generations to be sized according to each task's needs, which may reduce the amount of memory required for multitasking. Moreover, parameters related to minor garbage collections (e.g., promotion criteria, collection frequency, etc.) may be assigned on a per-task basis, thereby tailoring minor garbage collection according to each task's needs.

Figure 2:
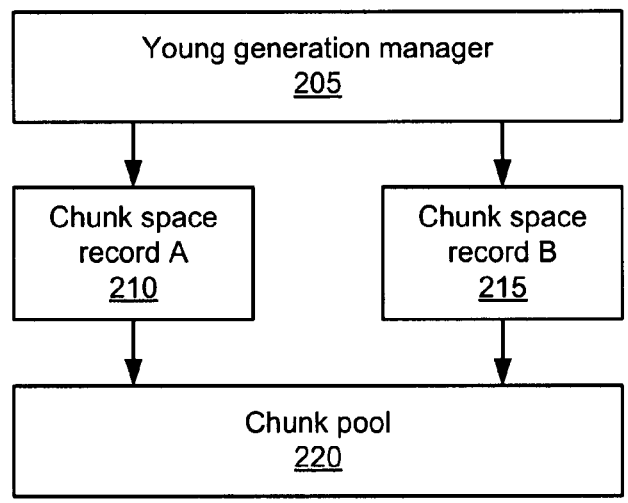
FIGS. 2-3 show diagrams of task-specific young generations in accordance with one or more embodiments of the invention.

In one or more embodiments, task-specific young generations are implemented using fixed-size chunks of memory allocated from a chunk pool. FIG. 2 shows a diagram of task-specific young generations in accordance with one or more embodiments of the invention. A portion of a memory heap is designated as a chunk pool (220), which is logically separated into multiple fixed-size chunks of memory. A young generation manager (205) keeps track of chunks allocated to each task using chunk space records (e.g., chunk space record A (210), chunk space record B (215). Each chunk space record identifies a set of contiguous chunks in the chunk pool (220). To this end, each chunk space record includes a pointer to the first chunk in the contiguous set and a count of the number of chunks in the set.

Figure 3:
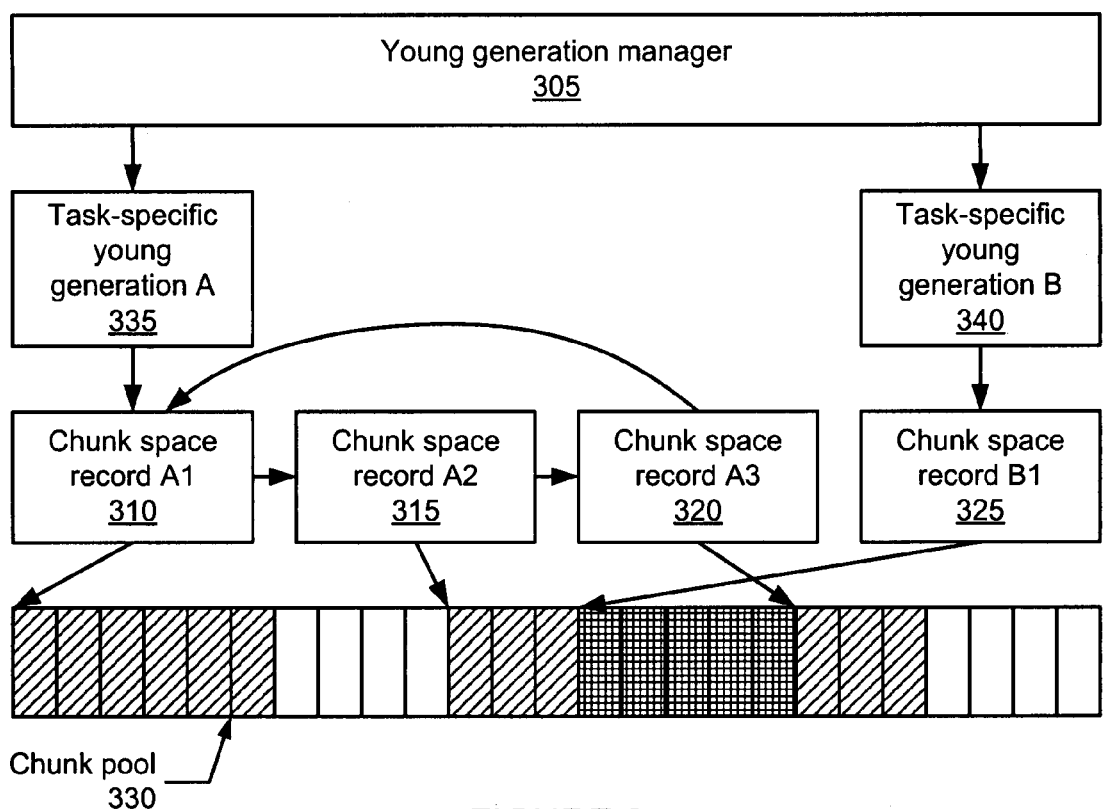

To illustrate the concept of chunk-based young generations, FIG. 3 shows a diagram of task-specific young generations in accordance with one or more embodiments of the invention. FIG. 3 is provided for exemplary purposes only and should not be construed as limiting the scope of the invention.

As shown in FIG. 3, a young generation manager (305) manages allocation of objects in a chunk pool (330), which is logically separated into fixed-size chunks of memory. After a task starts, the young generation manager (305) allocates a task-specific young generation for the task. Specifically, in one or more embodiments, the task issues a request for the young generation manager (305) to allocate a task-specific young generation of a given size. The young generation manager services the request by allocating enough chunks from the chunk pool (330) to form a task-specific young generation of the requested size.

In one or more embodiments, the specific chunks allocated for a task-specific young generation are selected such that as many of the chunks as possible are contiguous. Thus, each task-specific young generation includes one or more sets of contiguous chunks, and each set of contiguous chunks is identified with a chunk space record. Specifically, in this example, task-specific young generation A (335) and task-specific young generation B (340) are task-specific young generations for different tasks. Task-specific young generation A (335) includes chunk space record A1 (310), chunk space record A2 (315), and chunk space record A3 (320), and task-specific young generation B (340) includes chunk space record B1 (325).

Further, in this example, each task-specific young generation includes a circular list of chunk spaces to keep track of heap memory allocated to the corresponding task. Specifically, each chunk space record includes a pointer to a chunk space (i.e., a contiguous region of memory chunks), and a pointer to either the next chunk space record (if the end of the task-specific young generation has not yet been reached) or the first chunk space record (if the end of the task-specific young generation has been reached).

For example, chunk space record A1 (310) includes pointers to a chunk space and to chunk space record A2 (315). Similarly, chunk space record A2 (315) includes pointers to a chunk space and to chunk space record A3 (320). However, because chunk space record A3 (320) is the last chunk space record in this particular task-specific young generation, chunk space record A3 (320) includes pointers to a chunk space and to chunk space record A1 (310).

In one or more embodiments, the use of circular lists for task-specific young generations allows for task-specific young generations to be fully traversed from any starting point. Further, chunk spaces may be added and/or removed from task-specific young generations as objects are created, destroyed, promoted, etc. Moreover, chunk spaces may be defragmented, compressed, and/or otherwise optimized as needed. Such optimizations may occur, for example, following a minor garbage collection.

Alternatively, task-specific young generations may take other forms. For example, each task-specific young generation may be assigned a single contiguous region of the memory heap, and minor garbage collections may be performed as needed to keep the task-specific young generations within the limits of those regions.

In one or more embodiments, the shared older generation is a single contiguous region of memory, which is used to allocate promotion areas to tasks.

Promotion areas are smaller contiguous regions of memory within the shared older generation. Specifically, each task may be assigned an initial promotion area when the task starts, and more promotion areas may be added when objects are promoted from the task-specific young generation to the older generation during minor garbage collections.

Figure 4:
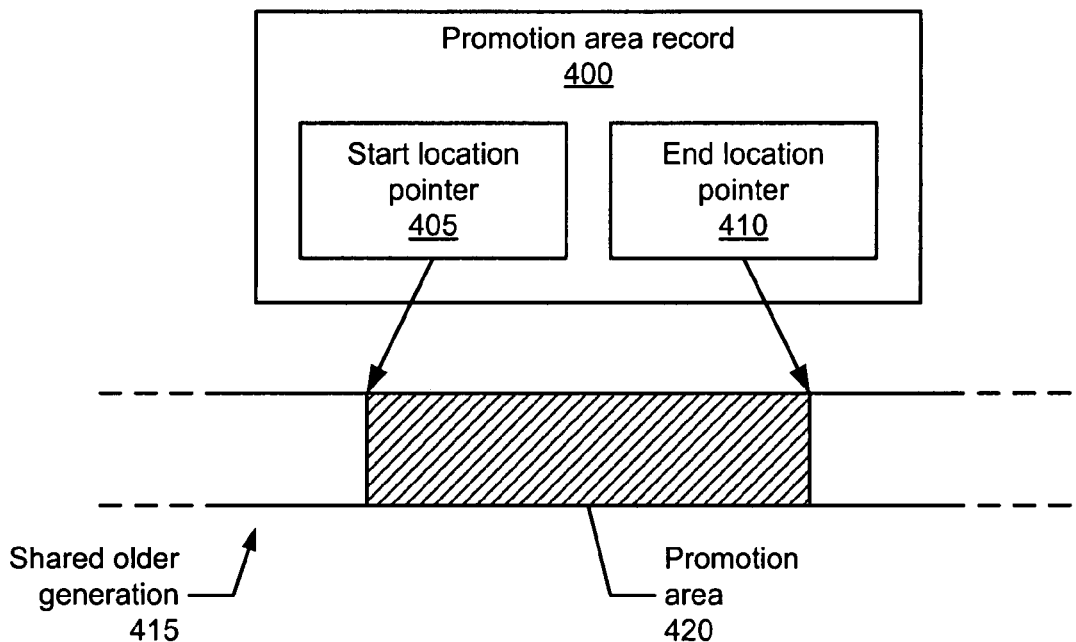
FIG. 4 shows a diagram of a shared older generation in accordance with one or more embodiments of the invention.

FIG. 4 shows a diagram of a shared older generation (415) in accordance with one or more embodiments of the invention. Specifically, FIG. 4 shows a diagram of a promotion area record (400) designating a promotion area (420) within the shared older generation (415). More specifically, the promotion area record (400) may include a start location pointer (405) and an end location pointer (410), indicating the beginning and end of the promotion area (420), respectively. Alternatively, the promotion area record (400) may include a start location pointer (405) and a value indicating the size of the promotion area (420). In one or more embodiments, promotion areas are sized to accommodate promotion of multiple objects.

Figure 5:
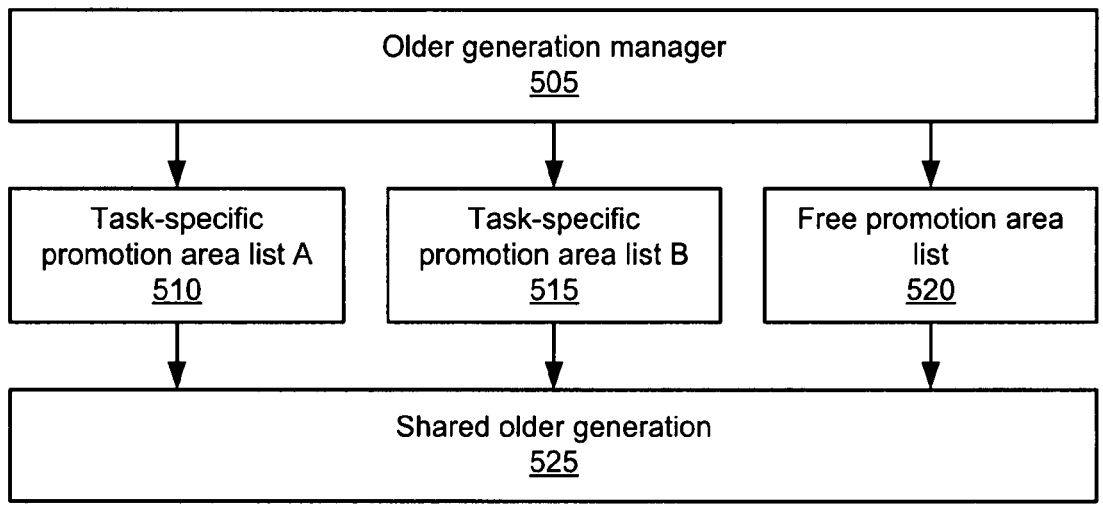
FIG. 5 shows a diagram of task-specific promotion area lists in accordance with one or more embodiments of the invention.

In one or more embodiments, promotion areas are task-specific. That is, each promotion area may be associated with only a single task at any given time. Accordingly, for each task, a task-specific promotion area list may be maintained. FIG. 5 shows a diagram of task-specific promotion area lists in accordance with one or more embodiments of the invention.

Specifically, as shown in FIG. 5, an older generation manager (505) is configured to maintain task-specific promotion area lists (e.g., task-specific promotion area list A (510), task specific promotion area list B (515)) for each task. The task-specific promotion area lists include promotion area records designating promotion areas within the shared older generation (525). Further, a free promotion area list (520) may be maintained. The free promotion area list (520) includes records of promotion areas that are freed when tasks terminate and/or during major garbage collections. Free promotion area lists are discussed in detail below.

Figure 6:
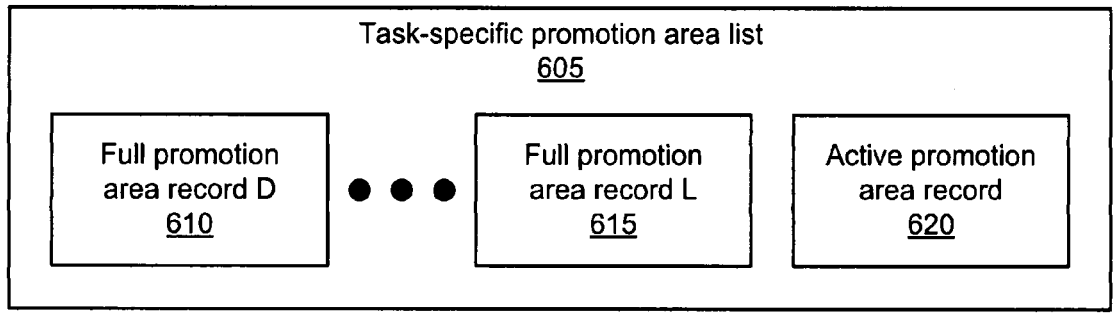
FIG. 6 shows an expanded diagram of a task-specific promotion area list in accordance with one or more embodiments of the invention.

Continuing with discussion of task-specific promotion area lists, FIG. 6 shows an expanded diagram of a task-specific promotion area list (605) in accordance with one or more embodiments of the invention. The task-specific promotion area list (605) includes an active promotion area record (620) designating a promotion area in which free memory is available to allocate promoted objects. Further, the task-specific promotion area list (605) may include one or more full promotion area records (e.g., full promotion area record D (610), full promotion area record L (615)), designating promotion areas that are no longer being used as active promotion areas.

Figure 7:
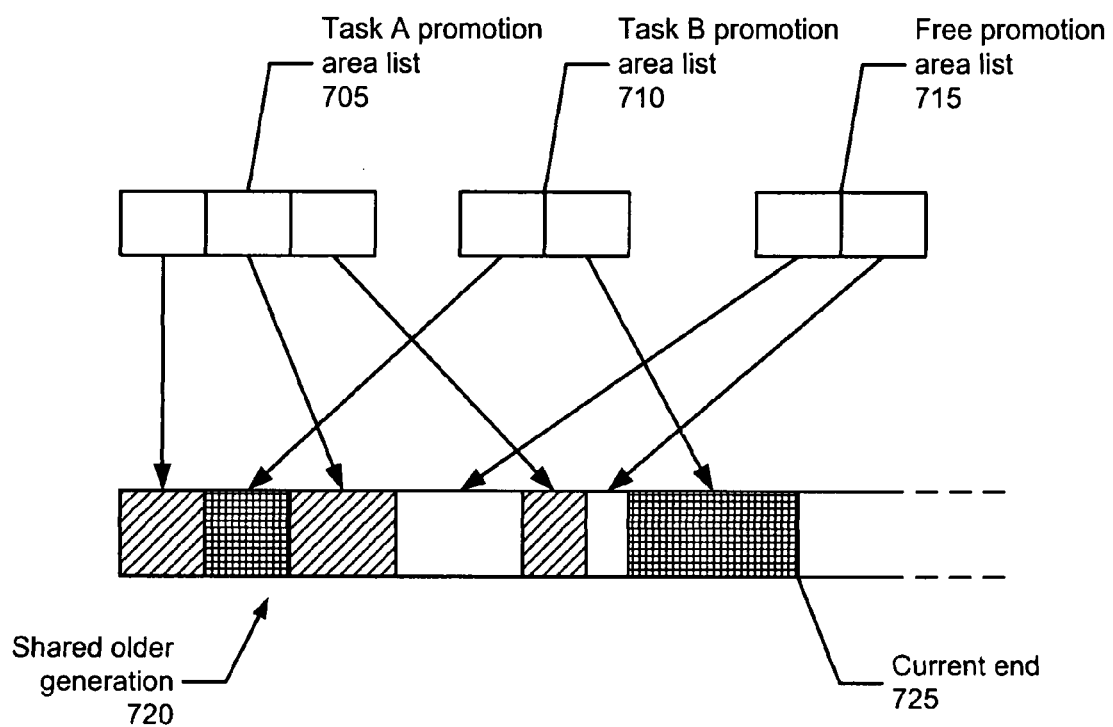
FIG. 7 shows a diagram of task-specific promotion area lists in accordance with one or more embodiments of the invention.

To illustrate the concept of task-specific promotion area lists, FIG. 7 shows a diagram of task-specific promotion area lists in accordance with one or more embodiments of the invention. FIG. 7 is provided for exemplary purposes only and should not be construed as limiting the scope of the invention.

As shown in FIG. 7, task A promotion area list (705) and task B promotion area list (710) are task-specific promotion area lists. Task A promotion area list (705) includes three promotion area records, and task B promotion area list (710) includes two promotion area records. The task-specific promotion area lists may be implemented, for example, as circular lists. Further, a free promotion area list (715) includes records of promotion areas that are not currently associated with any particular task.

In one or more embodiments, promotion areas are allocated in the shared older generation (720) only as needed, and free promotion areas at the end of the shared older generation (720) are discarded. Accordingly, the current end (725) of the shared older generation (720) may be identified as the end of the last full or active promotion area. In one or more embodiments, a pointer to the current end (725) of the shared older generation (720) is maintained and adjusted as promotion areas are created and/or discarded.

In one or more embodiments, task-specific promotion area lists provide a comprehensive view (except discarded promotion areas, as discussed below with respect to FIG. 11) of memory in the shared older generation used by individual tasks. Accordingly, when a task terminates, some or all of the task's memory in the shared older generation may be reclaimed without performing a major garbage collection. Further, because task-specific promotion area lists track objects belonging to the same task, task-specific promotion area lists may facilitate accounting of memory used by individual tasks.

Moreover, when a terminated task's promotion areas are freed, the task's young generation may also be freed without performing a minor garbage collection or any other type of object scanning. Specifically, freeing the task's promotion areas ensures that all references from the shared older generation to objects in the task-specific young generation are discarded. Accordingly, the task-specific young generation may be freed without any risk of leaving behind dangling references from the shared older generation to the task-specific young generation.

In addition, task-specific promotion area lists reduce the amount of the shared older generation to be scanned when identifying live objects during minor garbage collections. That is, identifying roots of young objects in the shared older generation is limited only to promotion areas associated with the same task. Moreover, by isolating objects belonging to different tasks, task-specific young generations and/or task-specific promotion area lists minimize synchronization issues when performing concurrent minor and/or major garbage collections for different tasks. Those skilled in the art will appreciate that synchronization of execution threads belonging to the same task may still be required.

Figure 8:
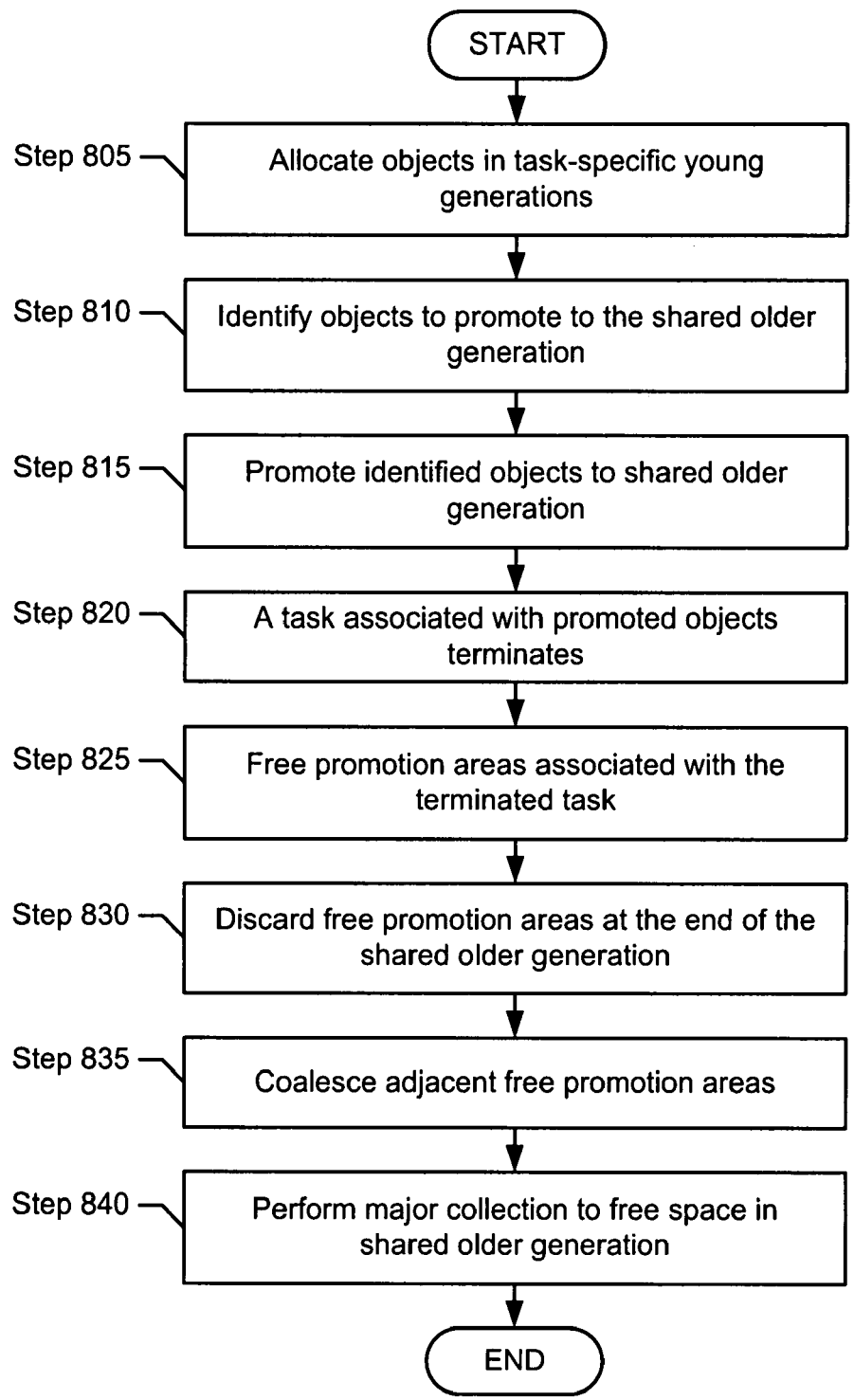
FIG. 8 shows a flowchart of a method for garbage collection in accordance with one or more embodiments of the invention.

FIG. 8 shows a flowchart of a method for garbage collection in accordance with one or more embodiments of the invention. In one or more embodiments, one or more of the steps shown in FIG. 8 may be omitted, repeated, and/or performed in a different order. Accordingly, the specific arrangement of steps shown in FIG. 8 should not be construed as limiting the scope of the invention.

In Step 805, objects are allocated in task-specific young generations. Specifically, as tasks create objects, the objects are allocated in the young generations uniquely associated with those tasks. In one or more embodiments, most objects are initially allocated in task-specific young generations. However, some objects may be allocated in common object space, and some objects may be allocated directly in promotion areas in the older generation. For example, certain types of objects (e.g., task-private representations of classes) and/or objects that don't fit in a task-specific young generation may be tenured directly to the shared older generation. In one or more embodiments, the task-specific young generations are managed by a young generation manager (e.g., young generation manager (125) of FIG. 1).

In Step 810, as part of a minor garbage collection, objects to promote from a task-specific young generation to a shared older generation are identified. The minor garbage collection may be initiated, for example, when the task-specific young generation is full or meets a threshold utilization value. Alternatively, minor garbage collection may be explicitly initiated by a task.

In one or more embodiments, the decision of whether to promote an object is based on the object's age (e.g., how many minor garbage collections the object has already survived, an elapsed time period since the object's creation, etc.). Alternatively, the decision may be based on the object's size, any other similar criteria, or any combination thereof. Objects that do not meet promotion criteria may be left in the task-specific young generation.

Further, during the minor garbage collection, dead objects may be discarded. Many different techniques for differentiating between live objects and dead objects exist. For example, a garbage collector may use reference counting, mark-sweep collection, copying collection, mark-compact collection, any other garbage collection technique, or any combination thereof. In one or more embodiments, minor garbage collection may use techniques described in copending U.S. patent application Ser. No. 11/705,361, entitled "Method and System for Minor Garbage Collection," filed on Feb. 12, 2007 in the names of the same inventors, and commonly owned by the same assignee. U.S. patent application Ser. No. 11/705,361 is hereby incorporated by reference in its entirety.

Continuing with discussion of FIG. 8, in Step 815, the identified objects are promoted to a shared older generation. Specifically, for each task, the identified objects associated with the task are promoted to one or more task-specific promotion areas in the shared older generation. Promoting objects to task-specific promotion areas is discussed in detail below with respect to FIGS. 9A-9B.

In Step 820, a task terminates. Those skilled in the art will appreciate that a task may terminate for many different reasons. For example, a task may terminate when a method completes, when an error condition is met, etc. Regardless of the reason(s) for the task terminating, objects used only by the terminated task are no longer needed. Accordingly, in Step 825, promotion areas associated with the terminated task may be freed. Specifically, promotion area records associated with the terminated task may be moved to a free promotion area list, so that the freed promotion areas may be used by other tasks. In one or more embodiments, the promotion area records are moved immediately after the task terminates, without performing a major garbage collection.

In some cases, a promotion area that is freed may be located at the end of the shared older generation. Said another way, there may not be any full or active promotion areas after the free promotion area. Accordingly, in Step 830, the free promotion area may be discarded. That is, the promotion area record describing the freed promotion area is not added to the list of free promotion areas, but is discarded instead. Accordingly, the pointer to the current end of the older shared generation is set to the beginning of the freed promotion area. In one or more embodiments, discarding such promotion area records reduces the amount of memory required to manage the shared older generation.

Further, a freed promotion area may be located next to another free promotion area. Accordingly, in Step 835, adjacent free promotion areas may be coalesced. That is, the free promotion area records for the adjacent free promotion areas may be replaced with a single free promotion area record. Reducing the number of free promotion area records reduces the amount of memory required to manage the shared older generation. Further, because the coalesced free promotion area is larger than the individual free promotion areas, coalescing adjacent free promotion areas may allow for larger objects to be promoted without creating new promotion areas.

In one or more embodiments, in Step 840, a major garbage collection is performed. Major garbage collections free space in the shared older generation by discarding promoted objects that are no longer used. Major garbage collections are discussed in detail below with respect to FIGS. 10-11.

Figure 9A:
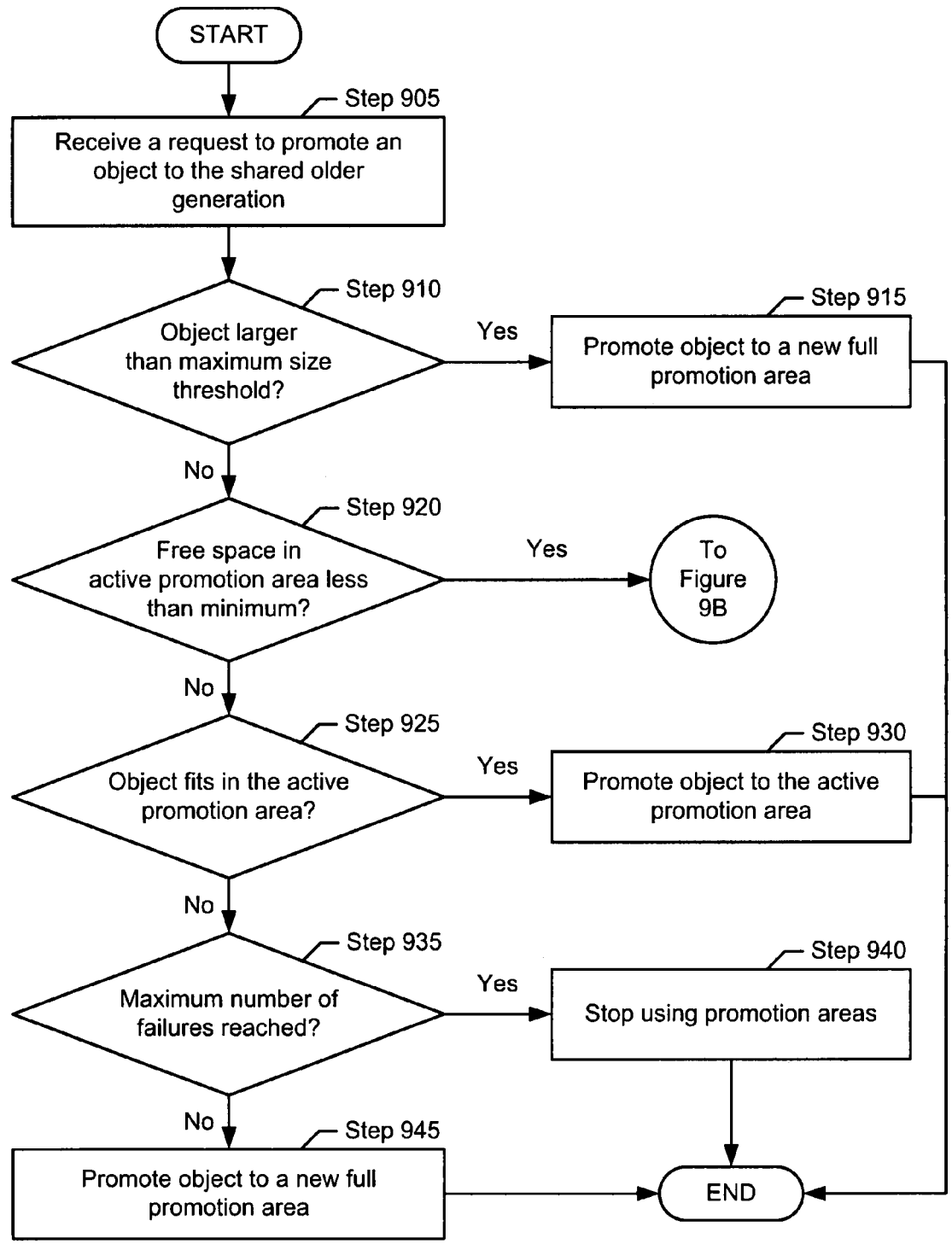
FIGS. 9A-9B show a flowchart of a method for promoting objects to task-specific promotion areas in accordance with one or more embodiments of the invention.
Figure 9B:
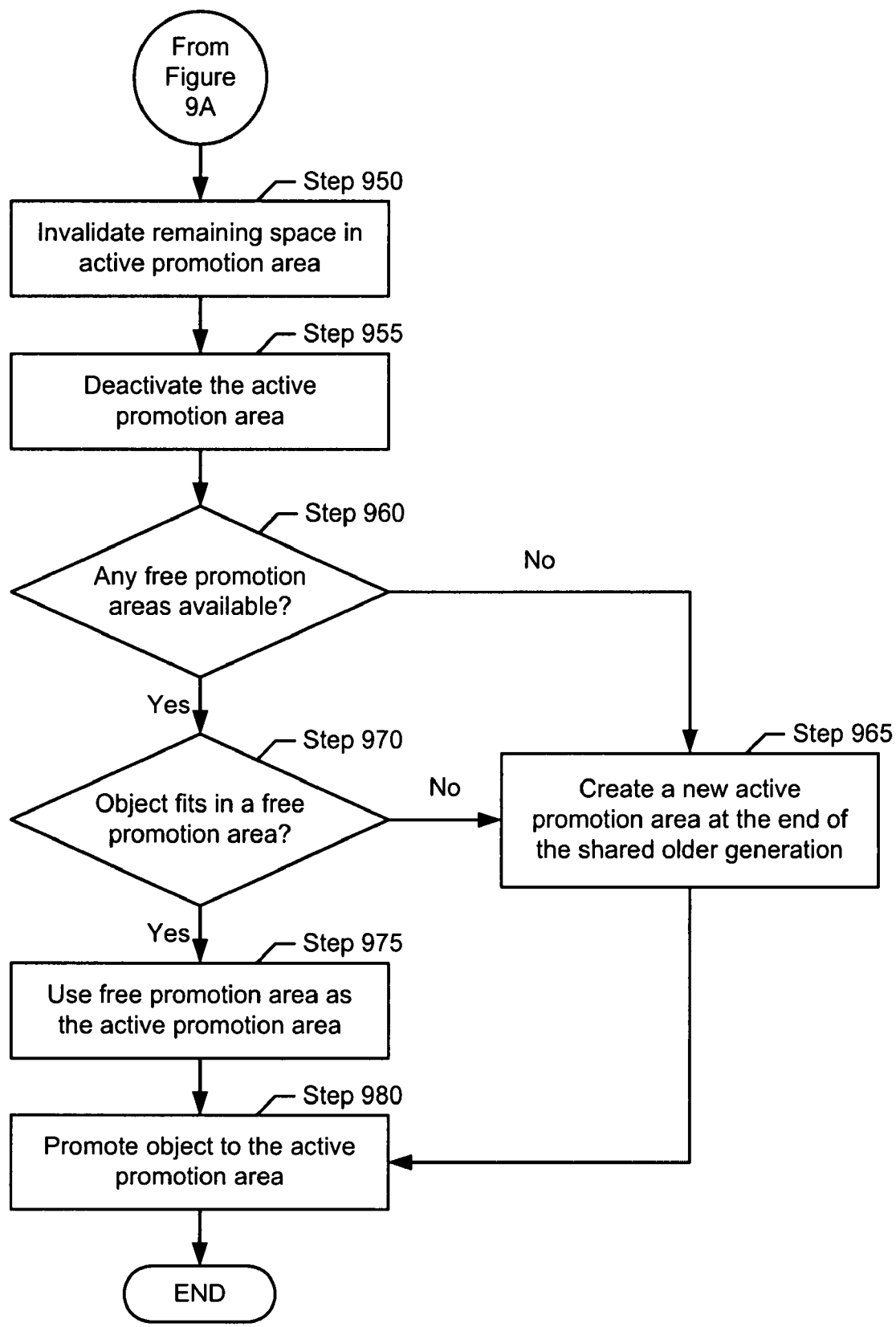

As discussed above, objects that satisfy promotion criteria may be promoted to task-specific promotion areas in the shared older generation. FIGS. 9A-9B show a flowchart of a method for promoting objects to task-specific promotion areas in accordance with one or more embodiments of the invention. In one or more embodiments, one or more of the steps shown in FIGS. 9A-9B may be omitted, repeated, and/or performed in a different order. Accordingly, the specific arrangement of steps shown in FIGS. 9A-9B should not be construed as limiting the scope of the invention.

Beginning with discussion of FIG. 9A, in Step 905, a request to promote an object to the shared older generation is received. For example, the request may be received by a method in an older generation manager. More specifically, a young generation manager may identify an object to be promoted, generate a request to promote the object, and issue the request to the older generation manager.

In one or more embodiments, individual free promotion areas are not allowed to exceed a maximum size threshold. For example, adjacent free promotion areas may not be coalesced if the resulting free promotion area would exceed the maximum size threshold. In one or more embodiments, enforcing a maximum size threshold increases the likelihood that multiple free promotion areas are available to service multiple tasks.

If individual free promotion areas are not allowed to exceed a maximum size threshold, then clearly no object exceeding the maximum size threshold will fit in any free promotion area. Accordingly, in Step 910, a determination may be made of whether the object to promote is larger than the maximum size threshold. If the object is larger than the maximum size threshold, then in Step 915, the object is promoted to a new full promotion area (i.e., to a promotion area created specifically to hold only the object). Said another way, the object may be copied to the current end of the shared older generation, and a corresponding full promotion area record may be added to the appropriate task-specific promotion area list. In such cases, the task's active promotion area is not changed.

Alternatively, if the object is not larger than the maximum size threshold, then the object may be able to fit in either the task's active promotion area or in a free promotion area. However, in some cases, the amount of free space in the active promotion area may be so small that the likelihood any object will fit in the remaining space is negligible. To account for this possibility, a minimum free space amount may be enforced. Specifically, in Step 920, a determination may be made of whether the amount of free space in the active promotion area is less than the minimum amount allowed.

If the amount of free space is less than the minimum amount allowed, then the method proceeds to FIG. 9B, discussed below. Alternatively, if the amount of free space is not less than the minimum amount allowed, then in Step 925, a determination may be made of whether the object to be promoted fits in the active promotion area. If the object fits, then in Step 930, the object is promoted to the active promotion area. If the object does not fit, then the promotion is considered a failure. That is, despite containing at least the minimum amount of free space, the active promotion area cannot accommodate the object.

In one or more embodiments, only a certain number of such failures is allowed. Accordingly, in Step 935, a determination may be made of whether the maximum number of failures has been reached. If the maximum number of failures has not been reached, then in Step 945, the object is promoted to a new full promotion area, similar to Step 915 discussed above. If the maximum number of failures has been reached, then in Step 940, the use of promotion areas may be stopped and another memory allocation scheme may be used instead. Alternatively, the maximum size threshold for promotion areas may be increased, thereby increasing the likelihood that larger objects will fit in active promotion areas. In one or more embodiments, counting failures and adjusting garbage collection accordingly reduces the likelihood of promotion areas causing performance bottlenecks.

As discussed above, in Step 920, if the amount of free space in the active promotion area is less than the minimum amount allowed, then the method proceeds to FIG. 9B. Turning now to discussion of FIG. 9B, in Step 950, any free space remaining in the active promotion area is invalidated. Specifically, the active promotion area record is adjusted so that the end of the active promotion area is located immediately after the last object allocated therein. Further, in Step 955, the active promotion area is deactivated, i.e., marked as a full promotion area.

In one or more embodiments, a free promotion area may be designated as a new active promotion area, regardless of which task the free promotion area was previously associated with. Thus, in Step 960, a determination may be made of whether any free promotion areas are available. If no free promotion areas are available, then in Step 965, a new active promotion area is created at the end of the shared older generation, and the end of the shared older generation is adjusted accordingly. In Step 980, the object is promoted to the new active promotion area.

Alternatively, if any free promotion areas are available, then in Step 970, a determination is made of whether the object to be promoted fits in any of the free promotion areas. For example, the determination may be made by traversing the free promotion area list until either a sufficiently large free promotion area is identified or the end of the free promotion area list is reached.

If none of the free promotion areas are sufficiently large for the object to be promoted, then in Step 965, a new active promotion area is created at the end of the shared older generation, and the end of the shared older generation is adjusted accordingly. In Step 980, the object is promoted to the new active promotion area. Alternatively, if a sufficiently large free promotion area is identified, then in Step 975, the free promotion area is designated as the new active promotion area, and in Step 980, the object is promoted to the new active promotion area.

Figure 10:
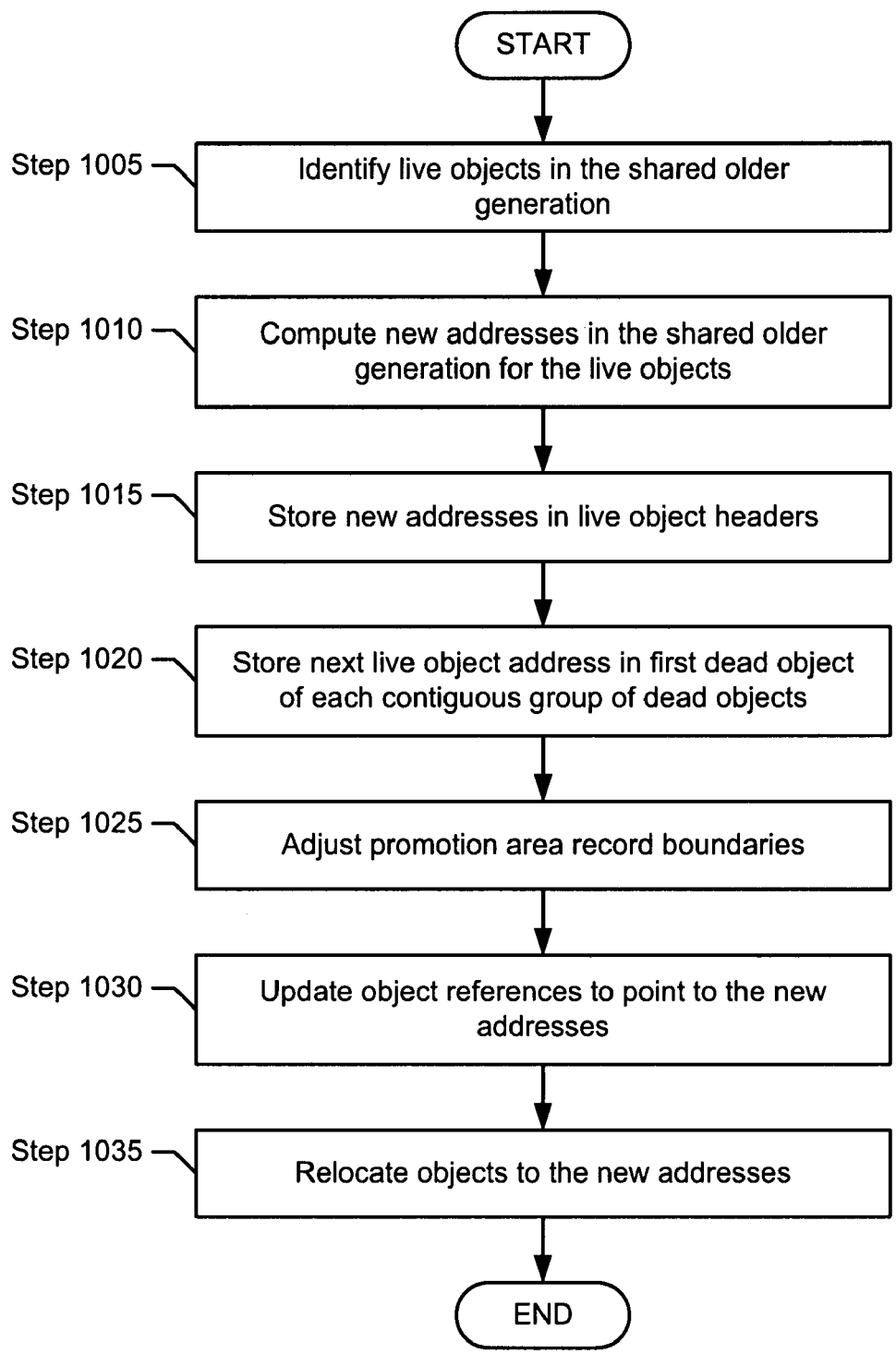
FIG. 10 shows a flowchart of a method for performing a major garbage collection in accordance with one or more embodiments of the invention.

As discussed above, major garbage collections free space in the shared older generation by discarding promoted objects that are no longer used. FIG. 10 shows a flowchart of a method for performing a major garbage collection in accordance with one or more embodiments of the invention. In one or more embodiments, one or more of the steps shown in FIG. 10 may be omitted, repeated, and/or performed in a different order. Accordingly, the specific arrangement of steps shown in FIG. 10 should not be construed as limiting the scope of the invention.

When performing a major garbage collection, live objects (i.e., objects that are currently in use) should not be discarded. Accordingly, in Step 1005, live objects in the shared older generation are identified. As discussed above with respect to FIG. 8, many different techniques for differentiating between dead objects and live objects exist. Further, those skilled in the art will appreciate that minor garbage collection and major garbage collection may use different techniques.

Once live objects in the shared older generation have been identified, memory occupied by dead objects (i.e., objects no longer in use) may be reclaimed for other uses. Further, the remaining live objects may be compacted to reduce the memory footprint of the shared older generation. Specifically, live objects may be moved to adjacent locations to reduce the amount of unused memory between the live objects. As part of the compaction process, in Step 1010, new memory addresses for the live objects are computed. Further, in Step 1015, the new addresses may be stored in the live objects' headers.

Further, to facilitate the compaction, in Step 1020, the address of the next live object may be stored in the header of the first dead object in each contiguous group of dead objects. In this manner, whenever the first dead object in a contiguous group of dead objects is encountered, the address of the next live object is readily available. Use of this header information is discussed in detail below with respect to FIG. 11.

Because the compression process removes unused memory and relocates live objects, the sizes and locations of promotion areas may also change. Accordingly, in Step 1025, promotion area record boundaries may be adjusted. Adjusting promotion area record boundaries is discussed in detail below with respect to FIG. 11.

Those skilled in the art will appreciate that when a live object is moved to a new address, any references to the live object must also be updated to use the new address. Specifically, an attempt to use an out-of-date object reference may result in an error. Accordingly, in Step 1030, object references are updated to point to the objects' new addresses. In Step 1035, the objects themselves are relocated to the new addresses.

As discussed above, the size and location of promotion areas may change during compaction of the shared older generation. FIG. 11 shows a flowchart of a method for adjusting promotion area record boundaries in accordance with one or more embodiments of the invention. In one or more embodiments, one or more of the steps shown in FIG. 11 may be omitted, repeated, and/or performed in a different order. Accordingly, the specific arrangement of steps shown in FIG. 11 should not be construed as limiting the scope of the invention.

Figure 11:
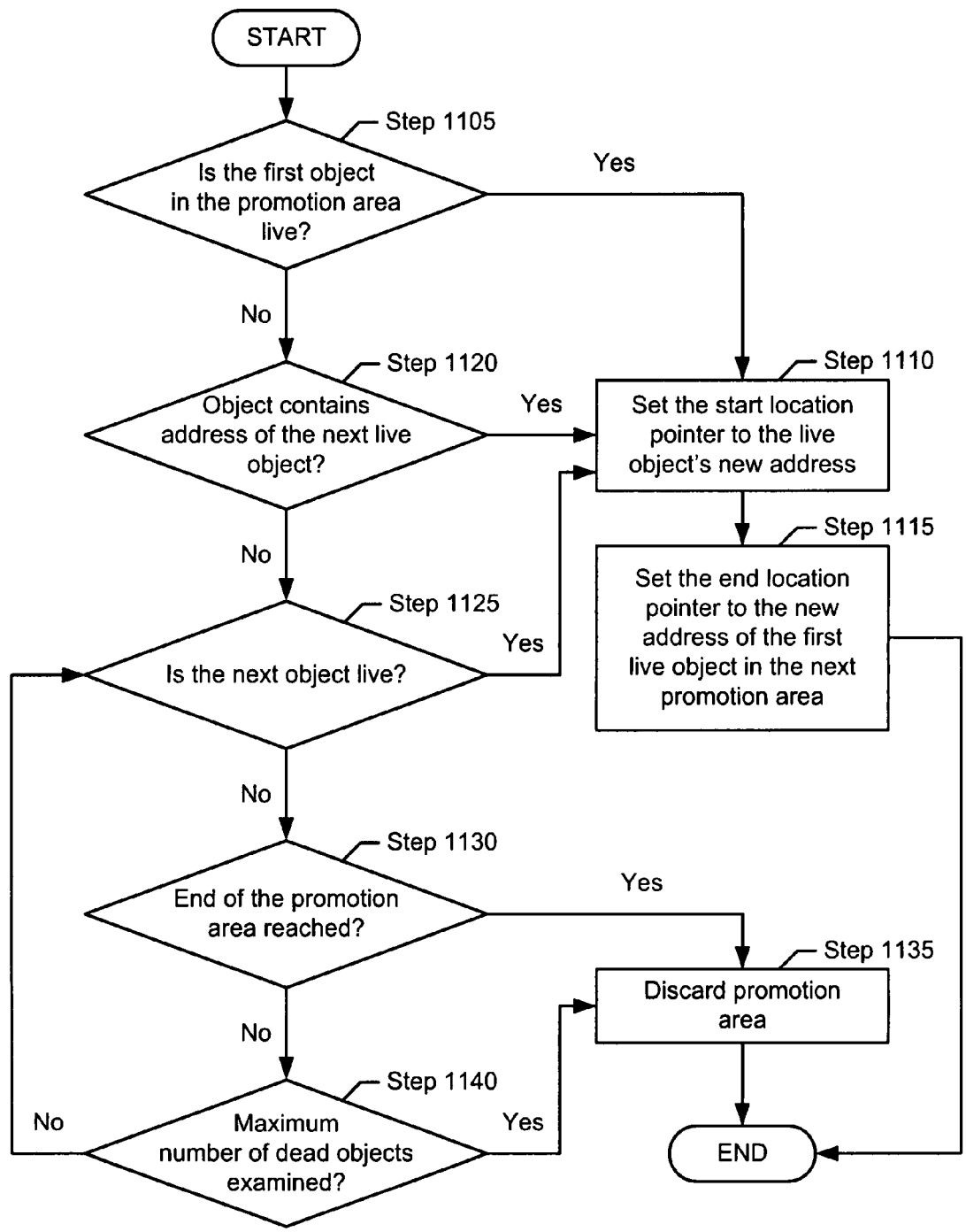
FIG. 11 shows a flowchart of a method for adjusting promotion area record boundaries in accordance with one or more embodiments of the invention.

Note that the method of FIG. 11 is performed before any objects have been moved to their new locations (i.e., before Step 1035 of FIG. 10). In particular, dead objects have not been overwritten. Accordingly, any live object addresses stored in Step 1020 of FIG. 10 are still available and valid.

In Step 1105, a determination is made of whether the first object in the promotion area (i.e., the object indicated by the promotion area record's start location pointer) is live. If the first object is live, then in Step 1110, the start location pointer is modified to point to the live object's new address. Further, in Step 1115, the promotion area record's end location pointer is modified to point to the first live object in the next promotion area. Specifically, the first live object in the next promotion area may be identified by performing the method of FIG. 11 for the next promotion area as well. To avoid the need for recursive processing, promotion area record boundaries may be adjusted beginning with the last promotion area in the shared older generation.

If the first object in the promotion area is not live, then in Step 1120, a determination is made of whether the object contains the address of the next live object. Specifically, if the first object in the promotion area is also the first object in a contiguous group of dead objects, then the address of the next live object may have been stored in the object's header in Step 1020 of FIG. 10. If the object contains the address of the next live object, then in Step 1110, the start location pointer is modified to point to the live object's new address, and in Step 1115, the promotion area record's end location pointer is modified to point to the first live object in the next promotion area.

If the first object in the promotion area does not contain the address of the next live object, then traversal of the promotion area begins. Specifically, in Step 1125, a determination is made of whether the next object in the promotion area is live. If the next object is live, then in Step 1110, the start location pointer is modified to point to the live object's new address, and in Step 1115, the promotion area record's end location pointer is modified to point to the first live object in the next promotion area.

If the next object is not live, then in Step 1130, a determination is made of whether the end of the promotion area has been reached. If the end of the promotion area has been reached, then the promotion area no longer contains any live objects. Thus, the promotion area is no longer needed, and in Step 1135, the promotion area is discarded.

If the end of the promotion area has not been reached, traversal continues. However, those skilled in the art will appreciate that a promotion area may include many dead objects. To avoid traversing a large number of dead objects, a maximum traversal threshold, i.e., a maximum number of dead objects to be examined, may be enforced. Specifically, in Step 1140, a determination may be made of whether the maximum number of dead objects has been examined. If the maximum number of dead objects has not been examined, or if no maximum traversal threshold is enforced, then in Step 1125, the next object in the promotion area is examined.

Alternatively, if the maximum number of dead objects has been examined, then in Step 1135, the promotion area is discarded. In such cases, any live objects in the promotion area are still relocated in Step 1035 of FIG. 10, but memory used to allocate those live objects is no longer considered part of a promotion area. In this manner, excessive processing due to promotion area traversal may be avoided.

Figure 12:
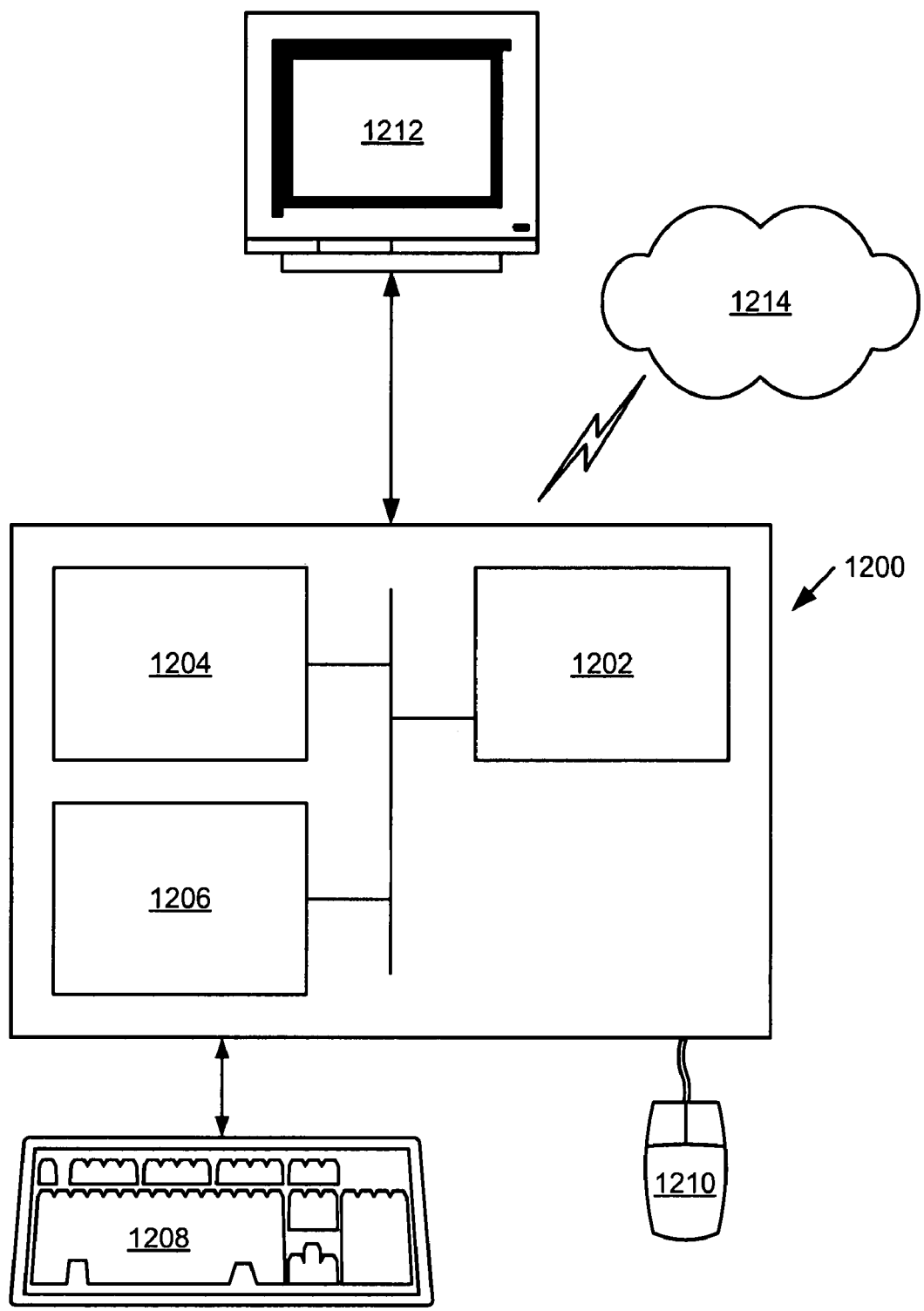
FIG. 12 shows a diagram of a computer system in accordance with one or more embodiments of the invention.

Embodiments of the invention may be implemented on virtually any type of computer regardless of the platform being used. For example, as shown in FIG. 12, a computer system (1200) includes a processor (1202), associated memory (1204), a storage device (1206), and numerous other elements and functionalities typical of today's computers (not shown). The computer (1200) may also include input means, such as a keyboard (1208) and a mouse (1210), and output means, such as a monitor (1212). The computer system (1200) may be connected to a network (1214) (e.g., a local area network (LAN), a wide area network (WAN) such as the Internet, or any other similar type of network) via a network interface connection (not shown). Those skilled in the art will appreciate that these input and output means may take other forms.

Further, those skilled in the art will appreciate that one or more elements of the aforementioned computer system (1200) may be located at a remote location and connected to the other elements over a network. Further, embodiments of the invention may be implemented on a distributed system having a plurality of nodes, where each portion of the invention (e.g., task, runtime environment, garbage collector, young generation manager, older generation manager, memory heap, task-specific young generation, shared older generation, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for garbage collection comprising:
   allocating a first plurality of objects in a young generation, wherein the first plurality of objects is specific to a first task, and wherein the young generation is specific to the first task;
performing a minor garbage collection, wherein performing the minor garbage collection comprises:
  identifying a first object of the first plurality of objects for promotion to a shared older generation;
  identifying a promotion area list specific to the first task and comprising an active promotion area record and a full promotion area record,
    wherein the active promotion area record designates a first promotion area in the shared older generation comprising free memory and occupied memory, and
    wherein the full promotion area record designates a second promotion area in the shared older generation comprising occupied memory; and
  promoting the first object of the first plurality of objects to the first promotion area in the shared older generation, wherein the first promotion area and the second promotion area are specific to the first task; and
freeing the young generation by freeing the first promotion area and the second promotion area when the first task terminates, wherein freeing the first promotion area creates a first free promotion area, and wherein the first promotion area is freed without performing a major garbage collection.

2. The method of claim 1, further comprising:
discarding the first free promotion area when the first free promotion area is located at an end of the shared older generation.

3. The method of claim 1, further comprising:
coalescing the first free promotion area with a second free promotion area when the first free promotion area is adjacent to the second free promotion area.

4. The method of claim 1, further comprising:
assigning the first free promotion area to a second task, to obtain an active promotion area specific to the second task; and
promoting a second plurality of objects to the active promotion area, specific to the second task,
wherein the second plurality of objects is specific to the second task.

5. The method of claim 1, further comprising:
stopping use of promotion areas once a maximum number of promotion failures is reached.

6. The method of claim 1, wherein performing the minor garbage collection further comprises:
receiving a request to promote a second object of the first plurality of objects to the shared older generation, wherein the second object is larger than a maximum size threshold for the first promotion area; and
copying the second object to an end of the shared older generation to obtain a third promotion area specific to the first task and specific to the second object.

7. The method of claim 1, wherein performing the minor garbage collection further comprises:
receiving a request to promote a second object of the first plurality of objects to the shared older generation, wherein the second object is larger than free space in the first promotion area;
allocating a third promotion area specific to the first task in the shared older generation; and
promoting the object to the third promotion area.

8. The method of claim 1, further comprising:
deactivating the first promotion area once free space in the first promotion area satisfies a minimum size threshold.

9. The method of claim 8, wherein deactivating the first promotion area comprises adding a record of the first promotion area to a list of full promotion area records.

10. The method of claim 1, wherein performing the major garbage collection comprises:
identifying a current address of a live object in the first promotion area;
computing a new address for the live object;
storing the new address in a header of the live object;
identifying a contiguous group of dead objects in the first promotion area;
storing the current address of the live object in a header of a dead object of the contiguous group of dead objects;
setting a starting pointer of the active promotion area record to the new address after encountering the dead object; and
moving the live object to the new address.

11. The method of claim 1, wherein performing the major garbage collection comprises:
identifying a current address of a live object in the second promotion area;
computing a new address for the live object;
storing the new address in a header of the live object;
identifying a contiguous group of dead objects in the second promotion area;
storing the current address of the live object in a header of a dead object of the contiguous group of dead objects;
setting a starting pointer of the full promotion area record to the new address after encountering the dead object; and
moving the live object to the new address.

12. A method for garbage collection comprising:
identifying a plurality of objects within a young generation for promotion to a shared older generation;
identifying a promotion area list comprising an active promotion area record and a full promotion area record,
  wherein the active promotion area record designates a first promotion area in the shared older generation comprising free memory and occupied memory, and
  wherein the full promotion area record designates a second promotion area in the shared older generation comprising occupied memory;
promoting the plurality of objects from the young generation to the first promotion area in the shared older generation, wherein the young generation, the first promotion area, and the second promotion area are specific to a task; and
performing a major garbage collection comprising:
  identifying a current address of a first live object objects in the first promotion area of the shared older generation;
  computing a new address for the first live object;
  storing the new address in a header of the first live object;
  adjusting a start pointer and an end pointer of the active promotion area record based on the new address of the first live object and a new address of a second live object in a third promotion area; and
moving the first live object to the new address.

13. The method of claim 12, further comprising:
identifying a contiguous group of dead objects in the first promotion area; and
storing the current address of the first live object in a header of a dead object of the contiguous group of dead objects.

14. A system comprising:
a processor;
a memory heap operatively connected to the processor and comprising:

a young generation specific to a task, and
a shared older generation; and
a garbage collector executing on the processor and configured to:
allocate a plurality of objects in the young generation, wherein the plurality of objects is specific to the task; and
perform a minor garbage collection by:
identify an object of the plurality of objects for promotion to the shared older generation;
identify a promotion area list specific to the task and comprising an active promotion area record and a full promotion area record,
wherein the active promotion area record designates a first promotion area in the shared older generation comprising free memory and occupied memory, and
wherein the full promotion are record designates a second promotion area in the shared older generation comprising occupied memory;
promote the object of the plurality of objects to the first promotion area; and
free the young generation by freeing the first promotion area and the second promotion area when the task terminates, wherein freeing the first promotion area creates a free promotion area, and wherein the first promotion area is freed without performing a major garbage collection.

15. The system of claim 14, wherein performing the major garbage collection comprises:
identifying a current address of a live object in the first promotion area;
computing a new address for the live object;
storing the new address in a header of the live object;
identifying a contiguous group of dead objects in the first promotion area;
storing the current address of the live object in a header of a dead object of the contiguous group of dead objects;
setting a starting pointer of the active promotion area record to the new address after encountering the dead object; and
moving the live object to the new address.

16. The system of claim 14, wherein performing the major garbage collection comprises:
identifying a current address of a live object in the second promotion area;
computing a new address for the live object;
storing the new address in a header of the live object;
identifying a contiguous group of dead objects in the second promotion area;
storing the current address of the live object in a header of a dead object of the contiguous group of dead objects;
setting a starting pointer of the full promotion area record to the new address after encountering the dead object; and
moving the live object to the new address.

17. A computer readable medium comprising executable instructions for garbage collection by:
allocating a plurality of objects in a young generation, wherein the plurality of objects is specific to a task, and wherein the young generation is specific to the task;
performing a minor garbage collection by;
identifying an object of the plurality of objects for promotion to a shared older generation;
identifying a promotion area list specific to the first task and comprising an active promotion area record and a full promotion area record,
wherein the active promotion area designates a first promotion area in the shared older generation comprising free memory and occupied memory, and
wherein the full promotion area record designates a second promotion area in the shared older generation comprising occupied memory; and
promoting the object of the plurality of objects to the first promotion area in a shared older generation, wherein the first promotion area and the second promotion area are specific to the task; and
freeing the young generation by freeing the first promotion area and the second promotion area when the task terminates, wherein freeing the promotion area creates a free promotion area, and wherein the first promotion area is freed without performing a major garbage collection to free space in the shared older generation.

18. The computer readable medium of claim 17, wherein performing the major garbage collection comprises:
identifying a current address of a live object in the first promotion area;
computing a new address for the live object;
storing the new address in a header of the live object;
identifying a contiguous group of dead objects in the first promotion area;
storing the current address of the live object in a header of a dead object of the contiguous group of dead objects;
setting a starting pointer of the active promotion area record to the new address after encountering the dead object; and
moving the live object to the new address.

19. The computer readable medium of claim 17, wherein performing the major garbage collection comprises:
identifying a current address of a live object in the second promotion area;
computing a new address for the live object;
storing the new address in a header of the live object;
identifying a contiguous group of dead objects in the second promotion area;
storing the current address of the live object in a header of a dead object of the contiguous group of dead objects;
setting a starting pointer of the full promotion area record to the new address after encountering the dead object; and
moving the live object to the new address.

* * * * *

UNITED STATES PATENT AND TRADEMARK OFFICE
CERTIFICATE OF CORRECTION

PATENT NO. : 7,870,171 B2
APPLICATION NO. : 11/705378
DATED : January 11, 2011
INVENTOR(S) : Laurent Philippe Daynes et al.

It is certified that error appears in the above-identified patent and that said Letters Patent is hereby corrected as shown below:

In Claim 12, Column 14 (line 49), "objects" should be deleted.

Signed and Sealed this
Twenty-ninth Day of March, 2011

David J. Kappos
*Director of the United States Patent and Trademark Office*